United States Patent
Lawson

(10) Patent No.: US 8,398,030 B2
(45) Date of Patent: Mar. 19, 2013

(54) CONTROL BAR WITH OUTER STEERING LINE TRIM AND SHEETING SYSTEM FOR SPORT KITE

(75) Inventor: Troy Lawson, Rodanthe, NC (US)

(73) Assignee: Ride Best, LLC, Rodanthe, NC (US)

( * ) Notice: Subject to any disclaimer, the term of this patent is extended or adjusted under 35 U.S.C. 154(b) by 97 days.

(21) Appl. No.: 13/187,033

(22) Filed: Jul. 20, 2011

(65) Prior Publication Data

US 2012/0018584 A1     Jan. 26, 2012

Related U.S. Application Data

(60) Provisional application No. 61/365,866, filed on Jul. 20, 2010.

(51) Int. Cl.
*A63H 27/08*     (2006.01)
(52) U.S. Cl. ..................... 244/155 A
(58) Field of Classification Search .......... 244/155 A, 244/155 R, 153 R
See application file for complete search history.

(56) References Cited

U.S. PATENT DOCUMENTS

| | | | |
|---|---|---|---|
| 5,026,007 A * | 6/1991 | Gellert ................. | 244/155 A |
| 6,514,115 B2 | 2/2003 | Harich | |
| 6,877,697 B2 | 4/2005 | Bellacera | |
| 7,036,771 B1 | 5/2006 | Pouchkarev | |
| 7,182,294 B2 | 2/2007 | Blackman | |
| 7,374,133 B2 | 5/2008 | Legaignoux et al. | |
| 7,575,198 B2 * | 8/2009 | Hardham et al. ......... | 244/155 A |
| 7,581,701 B2 | 9/2009 | Logosz et al. | |
| 7,621,485 B2 | 11/2009 | Logosz et al. | |
| 2007/0120016 A1 | 5/2007 | Eberle et al. | |
| 2008/0035796 A1 | 2/2008 | See et al. | |

* cited by examiner

*Primary Examiner* — Timothy D Collins
*Assistant Examiner* — Brian M O'Hara
(74) *Attorney, Agent, or Firm* — Mark D. Bowen; Malin Haley DiMaggio & Bowen, P.A.

(57) ABSTRACT

A kite control system having a control bar adapted with an internal sheeting system that provides trim/sheeting control by adjustment of outer steering lines which are attached at or near the rear corners of the kite. A tubular control bar is adapted such that the outer steering lines are routed through the interior of the control bar through openings at each opposing end. The outer steering lines are each joined to a sheeting control line which extends back out one of the opposing ends in either a left hand actuated or right hand actuated embodiment. A fixed pin located approximately mid-length within the control bar provides a fixed structure about which one of the outer lines and/or sheeting control line is routed in U-turn fashion. By pulling the sheeting control line from the end of the control bar, the rider can shorten the effective length of the outer steering lines thereby increasing the angle of attack so as to power up the kite. By releasing the sheeting control line such that it is drawn into the control bar, the ride can allow the outer steering lines to fully deploy thereby reducing the angle of attack so as to depower the kite. The control bar is equipped with means for selectively fixing the sheeting control line so as to achieve a desired angle of attack.

4 Claims, 3 Drawing Sheets

CONTROL BAR WITH OUTER STEERING LINE TRIM AND SHEETING SYSTEM FOR SPORT KITE

CROSS REFERENCE TO RELATED APPLICATIONS

This application claims the benefit of provisional U.S. Patent Application Ser. No. 61/365,866, filed on Jul. 20, 2010.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to rider control systems for propulsive wings and sport traction kites. More particularly the present invention relates to a kite control bar adapted with an internal outside-line sheeting system that functions to allow the rider to selectively increase and/or decrease tension on the outer control lines so as to control the resulting angle of attack of the kite.

2. Description of Related Art

The use of kites as a means of propulsion, e.g. traction kites, has existed for over a century. Kites were first used as a means of propulsion in pulling boats. Though already popular water and land based board sports such as surfing and snowboarding, the sports of kiteboarding and snow kiting have grown. These sports adapt the principals of surfing and snowboarding to include kites as a method for generating speed. Kitesurfing is done in the water, snowkiting is done on the snow with skis or a snowboard, and landboarding is done on the land on a mountain board. Generally speaking, if one stands on a board and uses a kite to be pulled along by the wind, it's kiteboarding. A number of advances, particularly to the design of the kite propulsion system, have led to improvements in safety, increases in top attainable speeds, and improvements in overall performance.

Most traction kites currently used in kiteboarding are constructed with flexible canopy having an inflatable leading edge armature which distributes dynamic loads via ropes connected to the leading edge. As used therein the terms "traction kite" or "kite" shall mean a propulsive wing that harnesses wind power to pull a rider through the water, snow, or other environment typically with a riding platform (e.g. a kite board, snow board, landboard, or other riding apparatus). An example of a basic traction is described in U.S. Pat. No. 4,708,078, issued to Legaignoux et al., which discloses a basic design for a leading edge inflatable ("LET") kite. Legaignoux discloses traction kite having an inflatable leading edge having an inflatable armature covered by a flexible envelope.

As kite sports have evolved, demand for kites with improved performance characteristics has grown. Specifically, kite users desire kites with improved power, handling, control, improved/faster turning speeds, and enhanced control response achieved with minimal user input force. As a result, the art reveals advancements in LEI kite design. One common LEI traction kite is referred to as the "C-Kite". The C-Kite is a common kite design that has been in use for many years. The C-Kite is named for the arc-like shape it forms while in flight which resembles the letter "C". The control line configuration for the C-Kite generally includes the attachment of four lines to the four corners of the kite which cause the kite to arc sharply while in flight. When viewed from above/overhead, the C-kite characteristically forms a convexly shaped trailing edge. A slight variation of the C-kite is the $5^{th}$ line C-kite which includes an extra line attached at the middle of the leading edge of the kite. The purpose of the $5^{th}$ line is to assist the rider in de-powering and re-launching the kite. De-powering is essentially a changing the aerodynamic characteristics of the kite and provides a safety procedure for the rider that reduces the propulsive surface area thereby reducing the force of the wind on the kite and the lines.

A more recent innovation in LEI traction kite design was the introduction of the "Bow Kite". The Bow Kite has two defining characteristics which differentiate it from the C-kite, including: 1) the trailing edge of the Bow Kite is concave; and 2) the Bow Kite is controlled by a series of control lines attached to the leading edge, commonly referred to as a bridle. The bridle is affixed to the leading edge and tips of the kite in a web-like fashion and causes the kite to possess a flatter shape (i.e. less leading edge curvature or arc) when in flight. The concave trailing edge and the addition of the bridle to the leading edge of the kite allow the kite to be de-powered with ease thus eliminating the need for a separate $5^{th}$ line. Furthermore, these features allow the Bow Kite to be adaptable to varying wind speeds, whereas the C-kite's design is better suited for specific wind speeds. U.S. Pat. No. 7,374,133, issued to Legaignoux, provides an example of a conventional Bow Kite. Even more recently hybrid kites have been produced which combine elements of both the C-kite and the Bow Kite. Although there are various forms of hybrid kites, all of them generally have a convex trailing edge and a leading edge bridle. The convex trailing edge is adapted from the C-kite and the leading edge bridle and bow configuration is adapted from the Bow Kite. The hybrid kite achieves a middle ground between the C-kite and the Bow Kite. It possesses a greater ability to de-power than the C-kite, but also allows for a greater performance and turning capability than the Bow Kite.

All of the above-referenced kites are typically controlled by the rider using a control bar having a plurality of lines affixed to the kite. By manipulation of the control bar and adjustment of tension on the lines, as well as line length, the rider is able to turn the kite as well as power and depower the kite. It is well known that the traction force (i.e. power) generated by a traction kite is largely dependent upon the angle of attack. The "Angle of Attack" ("AOA") is the angle at which the kite flies in relation to the wind. Generally speaking, increasing the angle of attack generates more lift and results in increased power, whereas decreasing the angle of attack generates less lift and results in decreased power. Accordingly, providing the rider with improved control is important in the sport of kite boarding.

One common control requirement involves the need to sheet or trim the kite. Sheeting mechanisms generally function to allow the kite operator to adjust the length of certain control lines so as to alter the angle of attack or pitch of the kite. Most traction kite sheeting systems function by requiring the rider to adjust central lines connected to the leading edge of the kite. For example, U.S. Pat. No. 6,877,697, issued to Bellacera, discloses kite control systems having a sheeting mechanism including a sheeting spool for one or more central sheeting lines which extend to the leading edge of the kite, and a sheeting regulator wrapped circumferentially around the sheeting spool. Rotation of the sheeting spool determines the deployed length of the sheeting lines.

U.S. Pat. No. 7,036,771, issued to Pouchkarev, discloses a kite control and depowering device wherein a control flying bar includes a continuous trim and safety flying line disposed at their lower ends over a rapid depowering apparatus. The depowering apparatus includes means for capturing and rapidly releasing an expansion disposed on the trim line, such that when rapid depowering is required, a simply release mechanism may be actuated to change the angle of attack of the airfoil rapidly.

U.S. Pat. No. 7,182,294, issued to Blackman, discloses a kite surfing bar wherein tension on the central lines may be adjusted via a system wherein the central lines are routed through the interior of the control bar via pulleys.

U.S. Pat. No. 7,581,701, issued to Logosz et al., discloses a kite control device including a bar having a fixed trim adjustment centrally located between the bar and the user to provide a safety depower function. Sheeting is accomplished by sliding the control bar up and down an adjustable chicken loop line system. U.S. Pat. No. 7,621,485, issued to Logosz et al., discloses a kite control system having a central trim line connected to the leading edge. The trim line is adjustable to allow the user to adjust and mechanically fix the length of the trim line while the kite is in flight. Similar control schemes are disclosed in Patent Application Publications Nos. US 2007/0120016 (Eberle et al.) and US 2008/0035796 (See et al.).

Kite control systems that accomplish trim and/or sheeting control using center lines attached to the leading edge (i.e. center line sheeting systems) all suffer from a number of significant disadvantages. One such disadvantage relates to safety. More particularly, if a center line sheeting system slips, the angle of attack can unexpectedly increase thereby causing the kite to power-up which can cause the rider to lose control. In addition, center line sheeting systems become difficult to adjust when the lines become twisted thereby inhibiting the rider's ability to control the kite. Accordingly, there exists a need for an improved kite control system that avoids the limitations and disadvantages present in the art.

BRIEF SUMMARY OF THE INVENTION

The present invention overcomes the limitations and disadvantages present in the art by providing a kite control system having a control bar adapted with an internal sheeting system that provides trim/sheeting control by adjustment of the outer steering lines which are attached at or near the rear corners of the kite. A tubular control bar is adapted such that the outer steering lines are routed through the interior of the control bar through openings at each opposing end. The outer steering lines are each joined to a sheeting control line which extends back out one of the opposing ends in either a left hand actuated or right hand actuated embodiment. A fixed pin located approximately mid-length within the control bar provides a fixed structure about which one of the outer lines and/or sheeting control line is routed in U-turn fashion. By pulling the sheeting control line from the end of the control bar, the rider can shorten the effective length of the outer steering lines thereby increasing the angle of attack so as to power up the kite. Conversely, releasing the sheeting control line such that it is drawn into the control bar, functions to allow the outer steering lines to fully deploy thereby reducing the angle of attack so as to depower the kite. The control bar is equipped with a cleat that allows the rider to selectively fix the sheeting control line so as to achieve a desired angle of attack.

A significant aspect of the present invention involves providing a kite control system wherein sheeting and trim control is accomplished using outer steering lines which are typically connected to the trailing edge of the kite. By allowing for adjustment of the outer steering lines, the present invention provides a sheeting system that is superior to prior art central line sheeting systems. More particularly, with the present invention, a slippage of the outside sheeting line system results in depowering the kite. In contrast, an unintended slippage of the center line sheeting systems results in powering up of the kite which can result in loss of control.

Accordingly, it is an object of the present invention to provide an improved control bar for use with sport traction kites.

Another object of the present invention is to provide an improved control bar incorporating an outer steering line trim and control system.

These and other objects are met by the present invention which will become more apparent from the accompanying drawing and the following detailed description of the drawings and preferred embodiments.

DETAILED DESCRIPTION OF THE INVENTION

Figure 1:
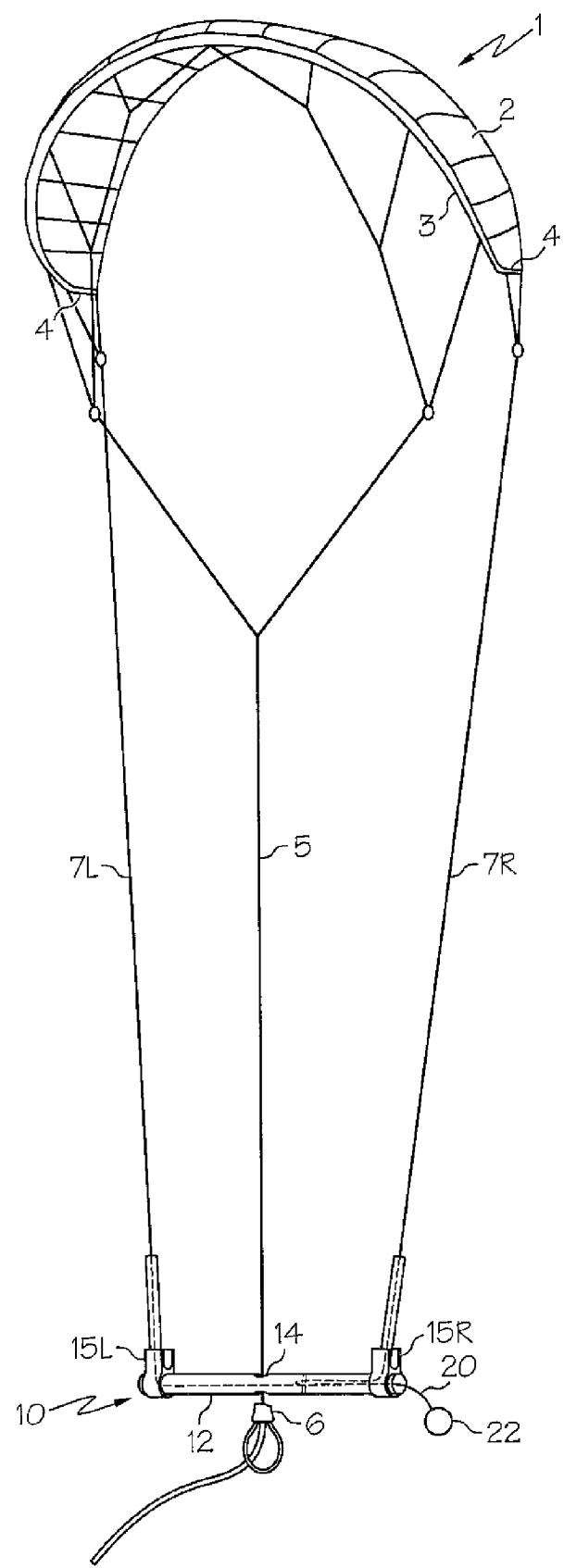
FIG. 1 depicts a sport traction kite connected to a kite control bar adapted with an internal sheeting system that provides trim/sheeting control by adjustment of the outer steering lines in accordance with the present invention.
Figure 2:
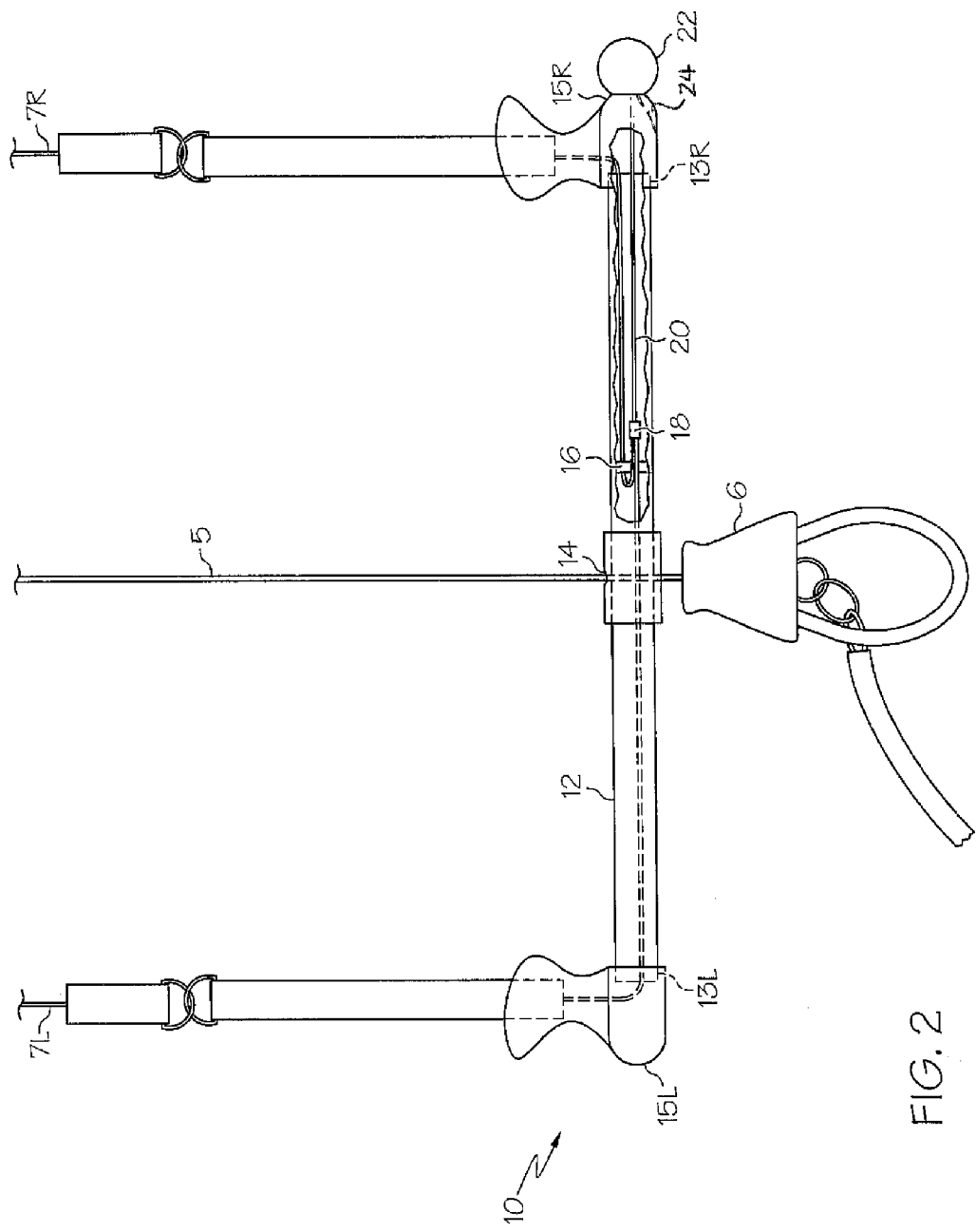
FIG. 2 depicts the control bar with the outer steering lines extended.
Figure 3:
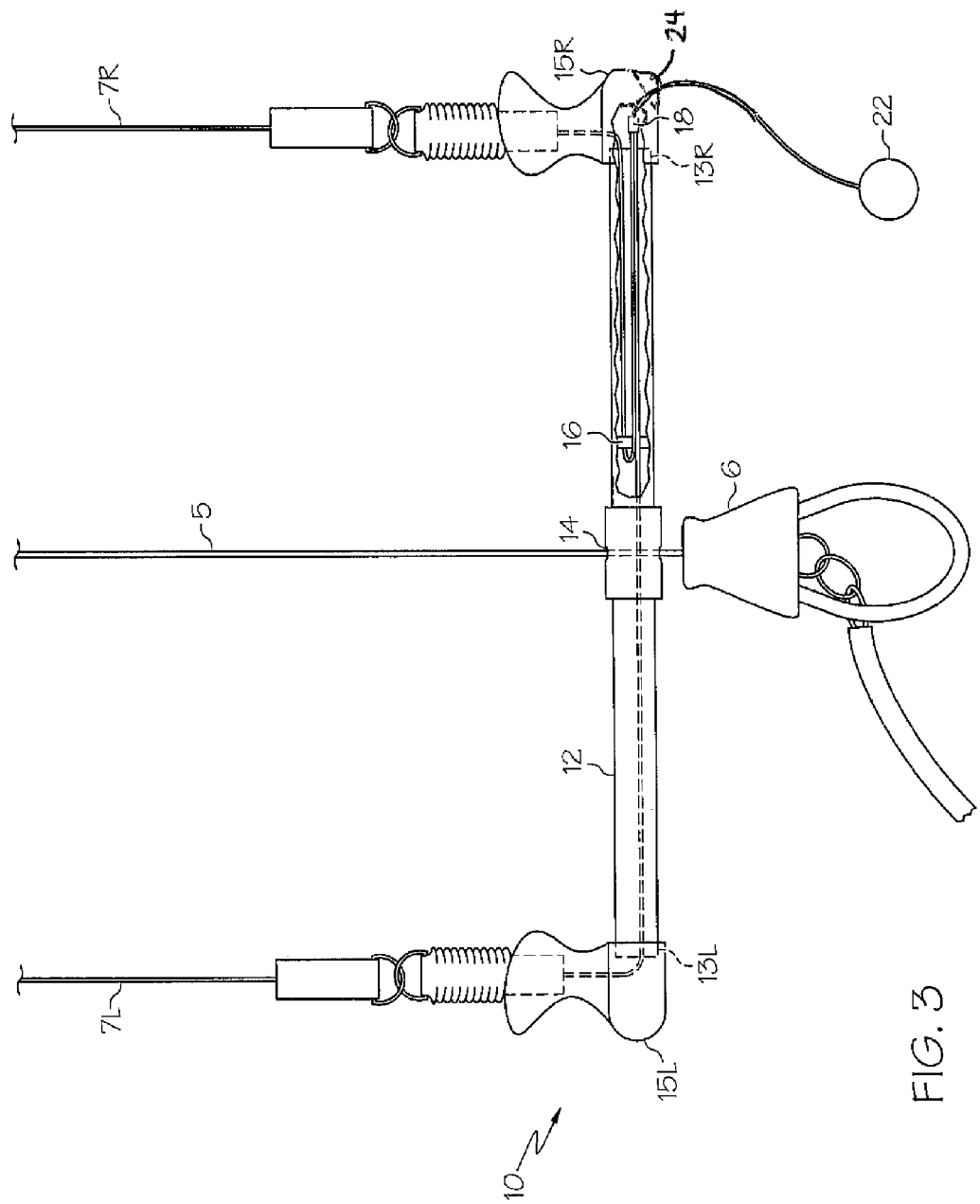
FIG. 3 depicts a kite control bar with the outer steering lines retracted.

With reference now to the drawings, FIGS. 1-3 depict a sport kite connected to a kite control bar adapted with an internal sheeting system that provides trim/sheeting control by adjustment of the outer steering lines in accordance with the present invention. FIG. 1 shows a schematic illustration of a kite control bar, generally referenced as 10, adapted with an internal sheeting system that provides trim/sheeting control by adjustment of the outer steering lines in accordance with the present invention.

Kite 1 includes a canopy 2 having leading edge 3 terminating at opposing ends or tips 4. Kite 1 comprises sport traction kite, such as the type used in kiteboarding, snow boarding, and the like. Kite 1 preferably comprises a leading edge inflatable ("LEI") kite, wherein the leading edge 3 is inflated either with or without an internal bladder. Kite 1 is controlled by the rider using control bar 10 and a series of control lines connected to kite 1. Control bar 10 includes an elongate rigid tubular main body 12. A first, centrally disposed control line 5 is connected to a quick release cuff 6 disposed on one side of control bar 10, and extends through a generally centrally disposed diametrically aligned aperture 14 formed in the tubular control bar main body 12. Control line 5 extends from the opposite side control bar 10 from cuff 6 and branches out to form a bridle assembly with individual lines connected to the leading edge 3 of kite 1. Adjusting the length of the central control line 5 changes the angle of attack of the kite. Additional left-hand and right-hand outer steering control lines, referenced as 7L and 7R extend from opposing ends of control bar 10 with each steering control line branching out for connection to an end or wing tip 4 of kite 1.

Control bar 10 is adapted with an internal sheeting system that provides trim/sheeting control by adjustment of the outer steering lines, 7L and 7R, which are attached at or near the opposing kite ends tips 4 as more fully disclosed herein. Control bar 10 includes an elongate rigid tubular member 12 defining an interior. Tubular member 12 is formed about an axis and terminates in opposing left and right open ends, referenced as 13L and 13R respectively. Tubular member 12 may be fabricated from a suitable metal, such as aluminum, or a composite material, such as fiberglass or carbon fiber, or any other suitable material. The left and right ends, 13L and 13R, of control bar 10 may optionally be fitted with a hand grip end caps, referenced as 15L and 15R through which outer steering lines 7L and 7R may be routed. As noted above, tubular member 12 defines a generally central and diametrically disposed aperture 14. A quick release cuff 6 is disposed on one side of control bar 10 (preferably the rider side) and is connected to central control line 5 which is routed through aperture 14 for connection to the leading edge 3 of kite 1.

A significant aspect of the present invention involves providing a kite control bar adapted with an internal sheeting system that provides trim/sheeting control of the kite 1 by selective adjustment of outer steering lines 7L and 7R. This is accomplished by adapting tubular control bar member 12 with an internal diametrically disposed pin, referenced as 16, as best illustrated in FIGS. 2 and 3. The outer steering lines 7L and 7R are routed into tubular control bar member 12 wherein the ends are joined at a union 18 to a sheeting control line 20. The end portion of outer steering line 7R is routed around pin 16 and sheeting control line 20 extends from the union 18 and from the open end of control bar tubular member 12. Pin 16 is located between ends 13L and 13R and preferably approximately mid-length within the control bar. Pin 16 provides a fixed structure about which one of the outer lines and/or sheeting control line is routed in U-turn fashion as best seen in FIGS. 2 and 3. Sheeting adjustment line 20 preferably terminates in a ball-shaped end member 22 that functions as a stop to prevent line 20 from retracting into tubular member 12, and further provides a structure for ease of grasping. Control bar 10 is further adapted with any suitable means, such as a notch or anchor point, to allow the user to fix line 20 thereby maintaining the outer steering lines 7L and 7R at desirable deployed length. The control bar depicted in FIGS. 1-3 is configured with line 20 extending out from the right end of control bar 10 thereby providing a control bar configured for right handed adjustment, however, it should be apparent that control bar 10 may equally be configured for left handled adjustment. Also control bar 10 may be configured in alternate embodiments with lines 7L and 7R configured to exit radially through apertures in tubular member 12, as opposed to exiting the ends longitudinally.

Control bar 10 functions to allow the user to trim and/or sheet the kite 1 by simultaneously extending and retracting both of the outer steering lines 7L and 7R simply by extending or allowing retraction of sheeting adjustment line 20 and fixing it relative to the control bar such that the outer steering lines are maintained at a user selected length thereby generally maintaining kite 1 at a corresponding trimmed configuration. FIG. 2 shows sheeting adjustment line 20 fully retracted within tubular member 12 of control bar 10 such that outer steering lines 7L and 7R are fully extended. In this configuration, ball shaped stop or end member 22 preferably butts up against right hand end cap 15R thereby preventing further extension of outer steering lines 7L and 7R. Accordingly, end member 22 functions as a stop to prevent adjustment line 20 from being pulled fully into control bar 10, while further providing a limit on outer steering line extension. This configuration results in kite 1 being trimmed so as to minimize the angle of attack. FIG. 3 depicts sheeting adjustment line substantially extended from tubular member 12 of control bar 10 such that outer steering lines 7L and 7R are retracted. In this configuration sheeting line 20 may be fixed relative to tubular member 12 of control bar 10 by a notch or cleat (not shown) defined in end cap 15R, or any other suitable means of retention. More particularly, a suitable means for allowing the user to fix sheeting adjustment line 20 relative to control bar 10 is provided. As should now be apparent, a rider is able to selective trim and/or sheet kite 1 by grasping end member 22 and pulling the sheeting control line 20 from the end of the control bar 12 to shorten the effective length of the outer steering lines 7L and 7R thereby increasing the angle of attack so as to power up the kite. Conversely, releasing the sheeting control line 20, such that it is drawn into the control bar 10 functions to allow the outer steering lines to fully deploy thereby reducing the angle of attack so as to depower the kite.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A control bar for controlling a traction kite, said control bar comprising:
    a tubular member formed about an axis and terminating in opposing left and right open ends;
    a pin fixed within said tubular member;
    a pair of left and right outer steering lines routed into said tubular member proximal said opposing left and right open ends respectively, said left and fight steering lines joined at a union;
    a sheeting control line having a first end connected to said union, said sheeting control line extending from said union and exiting said tubular member through one of said open ends; and
    a stop affixed to said sheeting control line external to said tubular member.

2. A control bar for controlling a traction kite according to claim 1 wherein the kite is controlled by selective extension and retraction of said sheeting control line causing corresponding extension and retraction of both of said left and right outer steering lines thereby adjusting the angle of attack of the kite.

3. A control bar for controlling a traction kite, said control bar comprising:
    a generally hollow control bar formed about an axis and defining an interior, said control bar terminating in opposing left and right open ends;
    a pin disposed within said interior, said pin generally traversing said control bar interior;
    a pair of left and right outer steering lines, each of said outer steering lines routed into said control bar proximal one of said opposing left and right open ends respectively, said left and right steering lines joined at a union;
    a sheeting control line having a first end connected to said union and a second end, said sheeting control line extending from first end and exiting said control bar proximal one of said open ends; and
    a stop affixed to said sheeting control line external to said tubular member.

4. A control bar for controlling a fraction kite according to claim 3 wherein the kite is controlled by user initiated extension and retraction of said sheeting control line causing corresponding extension and refraction of both of said left and right outer steering lines thereby adjusting the angle of attack of the kite.

* * * * *